Jan. 31, 1956

W. H. BIXBY 2,733,402

REGULATED RECTIFYING APPARATUS

Filed Jan. 12, 1953

INVENTOR
W. H. BIXBY
BY
G. F. Heuerman
ATTORNEY

Jan. 31, 1956   W. H. BIXBY   2,733,402
REGULATED RECTIFYING APPARATUS
Filed Jan. 12, 1953   2 Sheets-Sheet 2

INVENTOR
W. H. BIXBY
BY
G. F. Heuerman
ATTORNEY

United States Patent Office 2,733,402
Patented Jan. 31, 1956

2,733,402
REGULATED RECTIFYING APPARATUS

William H. Bixby, Detroit, Mich., assignor to Donald R. Middleton and Stanley M. Hanley, doing business under the name and style of Power Equipment Company, Detroit, Mich., a copartnership Application January 12, 1953, Serial No. 330,853

20 Claims. (Cl. 321—19)

This invention relates to current supply apparatus and particularly to apparatus for controlling the supply of rectified current from an alternating-current supply source to a load.

An object of the invention is to provide improved apparatus for controlling the supply of rectified current to a load to minimize load voltage changes.

There is disclosed in United States Patent 2,040,492 to F. G. Logan, May 12, 1936, an arrangement for supplying rectified current from an alternating-current supply source to a load and for controlling the current supplied to the load to tend to maintain the load voltage constant irrespective of load changes and irrespective of changes of supply voltage. There is provided for controlling the load current a saturable reactor having a saturating winding upon which is impressed a voltage equal to the difference of the load voltage and a reference voltage. The reference voltage is obtained by supplying current from the supply source to an alternating-current voltage regulator, such as is disclosed in United States Patent 1,830,232 to H. K. Kouyoumjian, November 3, 1931, and rectifying the output current of the alternating-current voltage regulator.

The current supply apparatus constructed in accordance with the present invention is in some respects similar to that disclosed in the Logan patent, but it has the advantage over the Logan arrangement that it is less expensive and that the load voltage does not change due to a change of frequency of the supply source.

In a specific embodiment of the invention herein shown and described for the purpose of illustration, there is impressed upon the saturating winding of a saturable reactor for controlling the rectified current supplied to the load, a voltage having a plurality of components a first of which is the voltage across a cold cathode, gas-filled, constant voltage device and another of which is a portion at least of the load voltage in opposition to the first component. Where the load voltage is equal to or slightly larger than the voltage across the constant voltage tube, the constant voltage tube may be energized by connecting it in a shunt path across the load, the shunt path comprising in series in the order named, the constant voltage tube, a resistor and the output voltage of an auxiliary rectifier energized from the supply source, this auxiliary voltage being in aiding relationship with respect to the load voltage so as to increase the voltage across the constant voltage tube and the resistor in series.

Where the load voltage is less than the voltage across the constant voltage tube, direct current for energizing the constant voltage tube is supplied by auxiliary rectifying means energized from the alternating-current supply source independently of the main rectifier which supplies rectified current to the load. In this case there is impressed upon the saturating winding of the saturable reactor a voltage having as components not only the voltage across the load and the voltage across the constant voltage tube, but an additional unidirectional voltage derived from the alternating-current supply source, this additional voltage component, as well as the load voltage, being in opposition to the voltage across the constant voltage tube. In some cases it is desirable to include in the circuit for energizing the saturating winding a portion of the voltage of the rectified voltage source for energizing the constant voltage device. There is preferably provided, in each of the embodiments of the invention, means for adjusting the load voltage to a desired operating value. For example, means may be provided for varying a portion of the rectified voltage which is in the circuit comprising the saturating winding, the load and the constant voltage tube.

The invention will now be described in greater detail with reference to the accompanying drawing in which.

Figure 1:
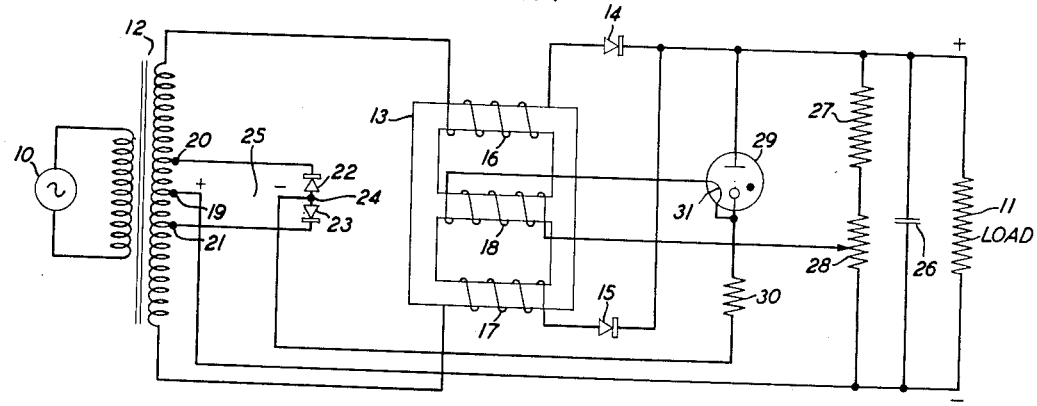
Fig. 1 is a schematic view of a power supply apparatus embodying the invention.

Referring now to Fig. 1 of the drawing, rectified current from an alternating-current supply source 10 is supplied to a load 11 through a circuit comprising a transformer 12, a saturable reactor 13 and rectifying elements 14 and 15. The saturable reactor 13 comprises a three-legged core, windings 16 and 17 wound on the outer legs, respectively, of the core and a saturating winding 18 wound on the middle leg of the core. The primary winding of transformer 12 is connected to the alternating-current supply source 10. One of the end terminals of the secondary winding of transformer 12 is connected through reactor winding 16 and through rectifying element 14 to the positive load terminal. The other end terminal of the secondary transformer winding is connected through reactor winding 17 and through rectifying element 15 to the positive load terminal. A mid-tap of the secondary winding of transformer 12 is connected to the negative load terminal. Full-wave rectified current is thus supplied to the load. The secondary transformer winding has two additional taps 20 and 21 equally spaced along the winding with respect to the mid-tap 19 so that the turns between taps 19 and 20 are equal to the turns between taps 19 and 21. There are provided two rectifying elements 22 and 23 having a common terminal 24. The other terminal of rectifying element 22 is connected to transformer tap 20 and the other terminal of rectifying element 23 is connected to transformer tap 21. There is thus provided an auxiliary rectifier 25 having a positive output terminal 19 and a negative output terminal 24. A 1000-microfarad condenser 26 is connected in a shunt path across load 11. A bleeder, voltage-divider path connected across the load 11 comprises in series a resistor 27 of 862 ohms one terminal of which is connected to the positive load terminal and a 100-ohm potentiometer 28 having one of its terminals connected to the negative load terminal. The load voltage may be set initially, by adjusting potentiometer 28, to a desired value between 115 volts and 120 volts, for example, and the load current may vary over a range including a maximum of 0.8 ampere, for example. Another shunt path across the load comprises in series a gas filled, cold cathode, constant voltage tube 29, a 2000-ohm resistor 30 having a first of its terminals connected to the cathode of tube 29 and the auxiliary rectifier 25 having its negative terminal connected to the second terminal of resistor 30, the positive terminal of the auxiliary rectifier 25 being conductively connected to the negative load terminal. The tube 29 has a conductive connection 31 between two of its terminals. The cathode of tube 29 is connected through the connection 31 to one terminal of saturating winding 18 of the saturable reactor 13 and the variable tap of potentiometer 28 is connected to the other terminal of saturating winding 18. The current path from the cathode of tube 29 to a terminal of saturating winding 18 is opened when the tube 29 is withdrawn from its socket to prevent an excessive rise of load voltage if the tube 29 should be removed from its socket.

The polarity of the auxiliary rectifier 25 is such as to aid the load voltage, that is, to increase the voltage across the tube 29 to start conduction therein and to increase the current through tube 29 and resistor 30 when the tube 29 is conducting. The voltage across tube 29 is substantially constant when conducting, the voltage across the tube being nominally 105 volts. Different tubes will have somewhat different starting voltages so that, if desired, two tubes may be connected in parallel and only the tube having the lower ignition voltage will become conducting. When that tube becomes defective and ceases to conduct, conduction will start in the other tube. A spare tube is thus provided.

There is thus formed a bridge circuit having the constant voltage tube 29 in a first arm, resistor 30 and the output voltage of rectifier 25 in a second arm, resistor 27 and a desired portion of the resistance of potentiometer 28 in a third arm, and the remaining resistance of potentiometer 28 in the fourth arm, the saturating winding 18 being connected to the vertices of the bridge which are the common terminal of the first and second arms and the common terminal of the third and fourth arms. The circuit constants may be such, for example, that for a predetermined load voltage the voltage across the constant voltage tube 29 will be equal to the voltage across resistor 27 and a portion of potentiometer 28 in the third arm of the bridge circuit. For this condition, no current will flow through the saturating winding 18 and, therefore, the impedance of windings 16 and 17 will be determined by the flux in the core due to the currents flowing through the windings 16 and 17. When the load voltage changes with respect to the predetermined value, the voltage across the tube 29 in the first arm of the bridge remains substantially constant and the voltage change across the fourth arm of the bridge which is a portion at least of the potentiometer 28 will be small relative to the load voltage change since the resistance of potentiometer 28 is small compared to the resistance of the shunt path 27, 28 across the load. Therefore, when the load voltage changes, nearly the entire change of load voltage appears across the saturating coil 18, the voltage across winding 18 being equal to the load voltage minus the substantially constant voltage across tube 29 in the first bridge arm minus the voltage across a portion at least of the potentiometer 28 in the fourth bridge arm the rate change of which is small relative to the change of load voltage.

When the load voltage increases from the predetermined load voltage, current flows in a first direction through winding 18 from the positive load terminal through tube 29, winding 18 and a portion of potentiometer 28 to the negative load terminal. When the load voltage decreases from the predetermined load voltage, current flows in the opposite direction through winding 18 from the positive load terminal through resistor 27 and the portion of potentiometer 28 in the third bridge arm, winding 18, resistor 30 and rectifier 25 to the negative load terminal. Current in winding 18 due to an increase of load voltage from the predetermined load voltage produces a magnetomotive force in the core which opposes the magnetomotive forces set up due to current in windings 16 and 17, thereby increasing the impedance of windings 16 and 17 and reducing the current supplied to the load. The assumed increase of load voltage is thus minimized. Current in winding 18 due to a decrease of load voltage from the predetermined load voltage produces a magnetomotive force in the core which aids the magnetomotive forces set up due to current in windings 16 and 17, thereby decreasing the impedance of windings 16 and 17 and increasing the current supplied to the load. The assumed decrease of load voltage is thus minimized.

Figure 2:
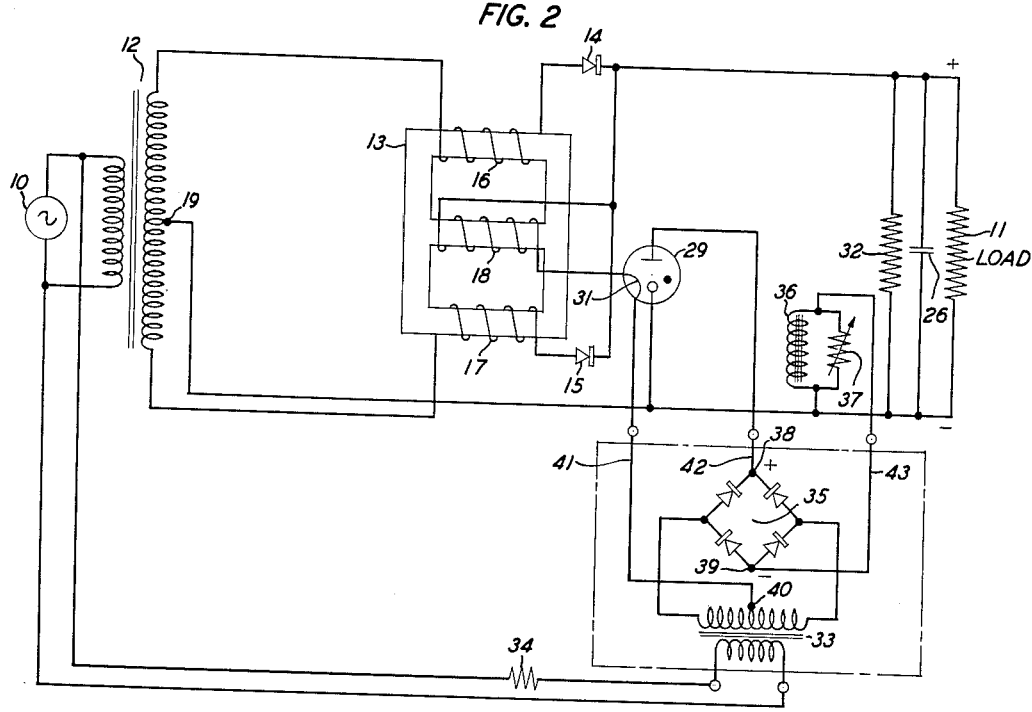
Figs. 2 and 6 are schematic views of modifications of the power supply apparatus shown in Fig. 1.

The embodiment of the invention shown in Fig. 2 is a modification of the power supply apparatus shown in Fig. 1 and the similar parts are given the same designations in the two figures. In Fig. 2, the load voltage is less than the voltage across the constant voltage tube 29. A bleeder resistor 32 is connected across the load instead of the resistor 27 and potentiometer 28 in series, as shown in Fig. 1. A second transformer 33 is provided having its primary winding connected through a ballast resistor 34 to the alternating-current supply source 10. There is provided an auxiliary bridge rectifier circuit 35 having its input terminals connected to the end terminals of the secondary winding of transformer 33. The anode of constant voltage tube 29 is connected to the positive output terminal 38 of the bridge rectifier 35 and the cathode of tube 29 is connected to the negative load terminal. There is provided a smoothing inductor 36 having one terminal connected to the negative output terminal 39 of rectifier 35 and its other terminal connected to the negative load terminal, an adjustable resistor 37 being connected in parallel with the inductor 36. One terminal of saturating winding 18 is connected to the positive load terminal and its other terminal is connected through the conductive connection 31 to a mid-tap 40 of the secondary winding of transformer 33.

Current is thus supplied from the positive terminal 38 of rectifier 35 through a path comprising the constant voltage tube 29 and in series therewith the reactor 36 and resistor 37, in parallel, to the negative terminal 39 of rectifier 35. A rectified voltage equal to substantially one-half the voltage between terminals 38 and 39 of rectifier 35 is set up between the positive terminal 38 and a negative terminal 40 which is the mid-tap of the secondary winding of transformer 33. The component voltages in a circuit including saturating winding 18 are the voltage across the load 11, the voltage from the negative terminal 40 to the positive terminal 38 and the voltage across the constant voltage tube 29, the voltage across the tube 29 being in opposition to each of the other two component voltages in this circuit. The circuit constants of Fig. 2 may be such that, for a predetermined load voltage, the current through saturating winding 18 will be zero. For this condition the voltage across tube 29 minus the voltage between terminals 38 and 40 will be equal to the load voltage. The voltage across tube 29 minus the voltage between terminals 38 and 40 may be referred to as a reference voltage. The reference voltage will be substantially constant when the line voltage from source 10 is constant. For this condition, when the load voltage changes, substantially the entire load voltage change will appear across the saturating winding 18. If the load voltage increases to a value above the pretermined load voltage, current will flow through winding 18 in a direction to cause the impedance of windings 16 and 17 to increase, thereby minimizing the assumed increase of load voltage. In this case the current flows from the positive load terminal through winding 18, from terminal 40 to terminal 38, and thence through tube 29 to the negative load terminal. If the load voltage decreases to a value below the predetermined load voltage, current will flow through winding 18 in the reverse direction to cause the impedance of windings 16 and 17 to decrease thereby minimizing the assumed decrease of load voltage. In this case the current flows from terminal 38 through rectifying elements of rectifier 35, in conductive condition, to terminal 40, through winding 18 to the positive load terminal, through the load to the negative load terminal, and thence through inductance 36 and resistor 37 in parallel to the terminal 39 of rectifier 35.

The voltage between terminals 38 and 40 varies with the line voltage from source 10. The voltage between terminals 38 and 40 is in aiding relationship with respect to the load voltage in the circuit including winding 18. Therefore, if the load voltage increases, as the result of an increase of line voltage, to cause an increase of current in winding 18, for example, the voltage between terminals 38 and 40 will also increase to cause a further increase of the current in winding 18. Compensation is thus provided for line voltage changes.

The arrangement shown in Fig. 2 permits the use of a constant voltage tube 29 the voltage across which is larger than the load voltage while maintaining at a relatively low value the resistance of the circuit through which current is supplied to the saturating winding 18. If, instead of including in this circuit the rectified voltage between terminals 38 and 40, a terminal of winding 18 were connected to a tap on a voltage-divider across the constant voltage tube 29, the resistance of the portion of the voltage-divider in the current path including the winding 18 would be too high to obtain the current changes through winding 18 required for satisfactory regulation. To use a low resistance voltage-divider across the tube 29 would make it difficult to obtain a sufficiently high starting voltage for the constant voltage regulator tube 29 and would increase the current variation through the tube 29 due to changes in the supply voltage to a point where, in most cases, it would exceed the allowable range for the tube.

With the arrangement shown in Fig. 2, a voltage for opposing the load voltage in the circuit of winding 18 is obtained which is slightly less than one-half the voltage across the constant voltage tube 29. An increase of the supply voltage 10, for example, will produce an increase of the voltage between terminal 38 and terminal 40 to tend to increase the current through winding 18 and thereby tend to prevent an increase of load voltage due to the increase to the supply voltage. This change of voltage between terminals 38 and 40 is dependent upon the voltage drop in rectifying elements of auxiliary rectifier 35 which connect the secondary winding of transformer 33 to the positive terminal 38 and this voltage drop, in turn, is dependent upon the current supplied from auxiliary rectifier 35 to the circuit comprising tube 29, reactor 36 and resistor 37. Therefore, by suitably adjusting the resistance of resistor 37 to adjust the current supplied from rectifier 35, a variation of the voltage between terminals 38 and 40 in response to line voltage changes can be obtained which will aid in compensating for the effect of line voltage changes on the main rectifier. Other methods for arriving at the proper resistance for this circuit for supplying current to the tube 29 could be used. For example, instead of using the shunting resistance 37, the inductor 36 could be built with low-ohmic resistance and resistance added in series therewith. The ballast resistor 34 limits the current through regulator tube 29 to a suitable value in the mid-portion of its operating range. The voltage required at the primary of transformer 33 must be appreciably below the minimum voltage of supply source 10 in order to achieve proper ballasting action.

The circuit of Fig. 2 is suitable for an output voltage of the order of 45 to 50 volts, the voltage across constant voltage tube 29 being nominally 105 volts. No control adjustment is provided for setting the load voltage. Fig. 2 may be modified to provide means for adjusting the output or load voltage by substituting for the portion of the circuit enclosed by the dash-dot line of Fig. 2, one of the modifications shown in Figs. 3, 4 and 5. The leads 41, 42 and 43 and other parts of Fig. 2 which are also found in Figs. 3, 4 and 5 are designated by the same numerals.

Figure 3:
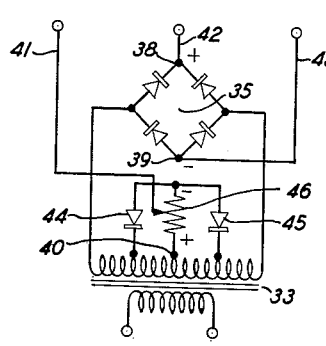
Figs. 3, 4 and 5 are schematic views of modifications of a portion of the power supply apparatus shown in Fig. 2.

In Fig. 3 there is provided a full-wave rectifier comprising rectifying elements 44 and 45 for rectifying the alternating voltage from a portion of the secondary winding of transformer 33 and impressing the rectified voltage across a potentiometer 46, the negative terminal of potentiometer 46 being the common terminal of rectifying elements 44 and 45 and the positive terminal of potentiometer 46 being the mid-terminal of the secondary winding of transformer 33. In this embodiment a variable direct voltage across a portion at least of potentiometer 46 is added in the series circuit comprising the load voltage, winding 18, the voltage across a portion at least of potentiometer 46, the voltage from terminal 40 to terminal 38, and the substantially constant voltage across tube 29, the variable voltage from potentiometer 46 being in aiding relationship with respect to the load voltage and the voltage from terminal 40 to terminal 38. Thus the load voltage is reduced with respect to the load voltage of Fig. 2. A potentiometer 46 of low resistance is used in Fig. 3 as well as in Figs. 4 and 5, as will be described, so as not to significantly increase the resistance of the circuit for supplying current to the saturating winding 18.

Figure 4:
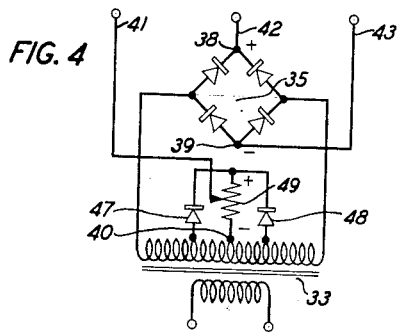

The modification of Fig. 4 is like that shown in Fig. 3 except that the rectifying elements 47 and 48 are reversed with respect to the rectifying elements 44 and 45, respectively. Therefore, the voltage across a portion at least of potentiometer 49 of Fig. 4 is opposed to the load voltage and to the voltage from terminal 40 to terminal 38 in the circuit for supplying current to saturating winding 18 so that the effect of adding the voltage across potentiometer 49 is to increase the load voltage with respect to the load voltage of Fig. 2.

Figure 5:
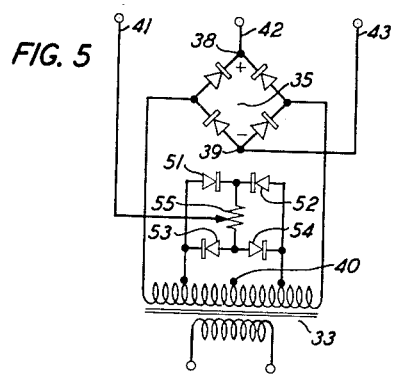

In Fig. 5 there are provided a bridge rectifier comprising rectifying elements 51, 52, 53 and 54, and a potentiometer 55 connected to the rectifier output terminals. The rectifier input terminals are connected to taps on the secondary winding of transformer 33 which are substantially equally spaced along the winding with respect to its mid-terminal 40. When the variable tap of potentiometer 55 is at its mid-point, the tap is at the same potential as the mid-point 40 of the secondary winding of transformer 33. For this condition the load voltage will be the same as it is in Fig. 2. Moving the variable tap of potentiometer 55 in one direction from the mid-point will cause the load voltage to be reduced and moving the variable tap in the other direction will cause an increase of the load voltage.

Figure 6:
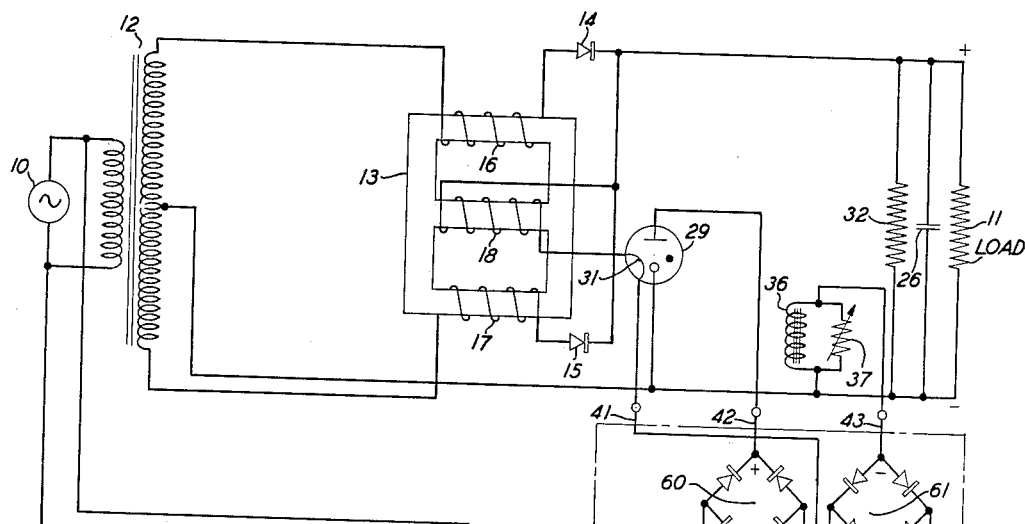

Fig. 6 shows a modification of the embodiment of the invention shown in Fig. 2 to obtain a load voltage which is considerably less than one-half the voltage across the voltage regulator tube 29. In a specific circuit designed in accordance with Fig. 6, a load voltage of 24 volts was obtained when using a voltage regulator tube the voltage across which was 105 volts. The parts of Fig. 6 corresponding to parts of Fig. 2 are designated by the same numerals. In Fig. 6 there are provided two bridge rectifiers 60 and 61, and transformer 33 has two secondary windings 62 and 63, the end terminals of winding 62 being connected to the input terminals of rectifier 60 and the end terminals of secondary winding 63 being connected to the input terminals of rectifier 61. The negative output terminal of rectifier 60 is conductively connected to the positive output terminal of rectifier 61, the positive output terminal of rectifier 60 is connected to lead 42 and the negative output terminal of rectifier 61 is connected to lead 43. A current path connecting the positive output terminal of rectifier 61 and a mid-tap of secondary transformer winding 63 comprises in series a 300-ohm resistor 64 and a 300-ohm potentiometer 65. The bleeder resistor 32 has a resistance of 15 ohms. The commutating capacitor 26 has a capacitance of 9000 microfarads. The nominal voltage across each half of the secondary winding of transformer 12 is 45.4 volts. The voltage across each of the secondary transformer windings 62 and 63 is 70 volts. The resistance of resistor 37 is 3000 ohms. The ballast resistor 34 has a resistance of 500 ohms.

It is seen that in Fig. 6 the voltage for supplying current to the circuit comprising tube 29 and, in series therewith, inductor 36 shunted by resistor 37 is the sum of the output voltages of rectifiers 60 and 61. The circuit for supplying current to saturating winding 18 may be traced from the positive load terminal through winding 18 to the variable tap of potentiometer 65, through a variable portion of potentiometer 65, through resistor 64 to the negative terminal of rectifier 60, from the positive terminal of rectifier 60 to the anode of tube 29 and from the cathode of tube 29 to the negative load terminal. The component voltages in this circuit are the load voltage, a voltage across resistor 64 and a portion of the resistance of potentiometer 65, the output voltage of rectifier 60 and the voltage across constant voltage tube 29. The load voltage, the output voltage of rectifier 60 and the voltage across resistor 64 and a portion of potentiometer 65 are all in aiding relationship in this circuit. The reference voltage is equal to the voltage across tube 29 minus the output voltage of rectifier 60 minus the voltage across resistor 64 and a portion at least of potentiometer 65 in series. When the load voltage increases from a value equal to the reference voltage to a value larger than the reference voltage, current flows through winding 18 in a direction to increase the impedance of windings 16 and 17 to minimize the assumed increase of load voltage. When the load voltage decreases from a value equal to the reference voltage to a value less than the reference voltage, current flows through winding 18 in a direction to decrease the impedance of windings 16 and 17 to minimize the assumed decrease of load voltage.

Figure 7:
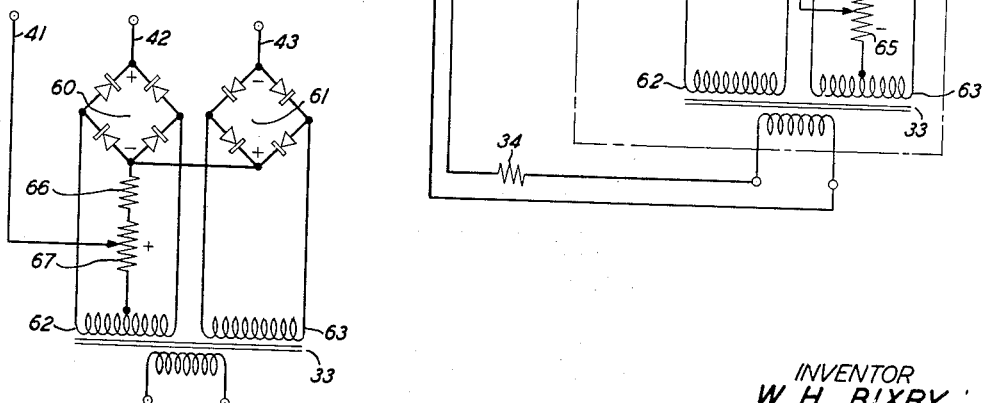
Fig. 7 is a schematic view of a modification of a portion of the power supply apparatus shown in Fig. 6.

Fig. 7 shows a modification of the portion of Fig. 6 which is enclosed by a dash-dot line, the corresponding parts in the two figures being designated by the same numerals. The resistor 64 and potentiometer 65 of Fig. 6 are omitted from Fig. 7 and instead there are provided a similar resistor 66 and a similar potentiometer 67 in a path connecting the negative terminal of rectifier 60 to the mid-terminal of the secondary transformer winding 62. In the modification of Fig. 7, the component voltages in the circuit for supplying energizing current to saturating winding 18 are the load voltage, the voltage between the variable tap of potentiometer 67 and the negative output terminal of rectifier 60, the output voltage of rectifier 60 and the voltage across constant voltage tube 29. In this circuit, the load voltage and the output voltage of rectifier 60 in aiding relationship are opposed by the voltage across resistor 66 and a portion of potentiometer 67 and by the voltage across tube 29. With this polarity of the voltage across resistor 66 and a portion of potentiometer 67, the reference voltage is larger than is the case in Fig. 6. Thus in Fig. 6 the load voltage is less than one-half the voltage across regulator tube 29 while in the modification of Fig. 7 the load voltage is greater than one-half the voltage across tube 29.

In Fig. 6 the resistor 64 and potentiometer 65 could be connected between the center tap of transformer winding 63 and the negative terminal of rectifier 61 if a still lower output voltage were desired or the resistor and potentiometer could be connected between the positive and negative terminals of rectifier 61 if a wider range of load voltage adjustment were desired. In Fig. 7 the resistor 66 and potentiometer 67 could equally well be connected between the mid-tap of transformer winding 62 and the positive terminal of rectifier 60 if a higher output voltage were desired or these elements could be connected between the positive and negative terminals of rectifier 60 if a wider range of adjustment of load voltage were desired. The output voltages of rectifiers 60 and 61 in Figs. 6 and 7 need not be equal, but can be suitably proportioned to best provide the load voltage level and adjustment range desired. The voltage between the positive terminal of rectifier 61 and the mid-tap of secondary transformer winding 63 of Fig. 6, for example, being much smaller than the voltage across constant voltage tube 29, the resistance of the voltage-divider 64, 65 can also be much smaller than that of a voltage divider if connected across the tube 29. Thus, in Figs. 6 and 7, the resistance of the path for supplying current to winding 18 is held to a relatively small value, as is desirable.

In an experimental circuit constructed as shown in Fig. 6, the load voltage was maintained substantially constant over a range of load current of 1.6 amperes through the bleeder resistor 32 alone, to a total load current of 11.6 amperes with voltage variations of the 60-cycle per second supply source 10 from 103.5 volts to 126.5 volts.

What is claimed is:

1. In combination, a reactor having a first winding and a second winding for controlling the impedance of said first winding in response to current supplied to said second winding, an asymmetrically conducting device, means for supplying current from an alternating-current supply source the voltage of which may vary through said first winding and said asymmetrically conducting device in series to a load to set up a unidirectional voltage across said load, a cold cathode gas filled space current device the resistance of which varies in response to current changes therethrough at a rate to cause the voltage across said device to remain substantially constant, the voltage required for initiating space current conduction in said device being larger than said load voltage, resistive means, means for deriving from said supply source and impressing across said space current device and said resistive means in series a unidirectional voltage larger than said load voltage for initiating space current conduction through said space current device, means comprising said space current device for connecting one terminal of said second winding to one terminal of said load, a voltage dividing resistance path connected across said load, and means for connecting the other terminal of said second winding to the other terminal of said load through a portion of said path the resistance of which is of the order of one-tenth the total resistance of said path.

2. A combination in accordance with claim 1 in which the circuit comprising said second winding and said load causes current flow in one direction through said second winding when the load voltage is larger than a certain predetermined value and causes current flow in the opposite direction through said second winding when said load voltage is less than said predetermined value.

3. In combination, a reactor having a first winding and a second winding for controlling the impedance of said first winding in response to current supplied to said second winding, a rectifier, means for supplying current from an alternating-current supply source the voltage of which may vary through said first winding and said rectifier in series to a load to set up a unidirectional voltage across said load, a unidirectionally conducting space current device having a space current path the resistance of which varies in response to current changes therethrough at a rate to cause the voltage across said space current path to remain substantially constant, resistive means, means for deriving from said supply source and impressing across said space current device and said resistive means in series a unidirectional voltage larger than said load voltage and which may vary in response to voltage changes of said supply source to cause a unidirectional voltage to be set up across said space current device, and means for impressing upon said second winding a voltage having a plurality of unidirectional voltage components, a first of said voltage components being the voltage across said space current device and a second of said voltage components being a portion at least of said load voltage in opposition to said first voltage component.

4. In combination, a saturable reactor having a first winding and a second winding each for setting up a magnetomotive force in a magnetic circuit, the impedance of said first winding being determined by the resulting flux in said magnetic circuit, a rectifier, means for supplying current from an alternating-current supply source through said first winding and said rectifier in series to a load to set up a unidirectional voltage across said load, a voltage stabilizing device the resistance of which varies in response to current changes therethrough at a rate to cause the voltage across said device to remain substantially constant, means for deriving from said supply source and for supplying to said voltage stabilizing device a unidirectional current to cause a first unidirectional voltage to be set up across said voltage stabilizing device, means for deriving from said supply source a second unidirectional voltage, and means for impressing upon a circuit comprising said second winding a voltage having as components said first and second voltages and said load voltage, said second voltage and said load voltage being in aiding relationship in said circuit and said first voltage being opposed to said second voltage and said load voltage.

5. In combination a saturable reactor having a first and a second winding wound on a core of magnetic material, a rectifier, means including said rectifier for supplying rectified current from an alternating-current supply source through said first winding to a load, a constant voltage device, means for deriving from said supply source a first unidirectional voltage and a second unidirectional voltage larger than said first unidirectional voltage, means for impressing said second voltage upon a first circuit comprising said constant voltage device for causing to be set up across said constant voltage device a third voltage which is substantially constant and larger than said first voltage and larger than the voltage across said load, and means for impressing upon a second circuit comprising said second winding to control the impedance of said first winding a voltage having as components said first and third voltages and said load voltage, said first voltage and said load voltage being in aiding relationship in said circuit and in opposition to said third voltage.

6. A combination in accordance with claim 5 in which said first circuit comprises inductive reactance and resistance.

7. In combination, a saturable reactor having a first winding and a second winding wound on a core of magnetic material, a rectifier, means including said rectifier for supplying rectified current from an alternating-current supply source through said first winding to a load, a constant voltage device, means for deriving from said supply source a first, a second and a third unidirectional voltage, means for impressing said second and third voltages in series aiding relationship upon a first circuit comprising said constant voltage device for causing to be set up across said constant voltage device a fourth voltage which is substantially constant and larger than each of said first voltage, said second voltage, said third voltage and said load voltage, and means for impressing upon a second circuit comprising said second winding to control the impedance of said first winding a voltage having as components said first, second and fourth voltages and said load voltage, said second voltage and said load voltage being in aiding relationship in said circuit and in opposition to said fourth voltage.

8. A combination in accordance with claim 7 in which said first circuit comprises inductive reactance and resistance.

9. A combination in accordance with claim 7 in which said first voltage is less than each of said second and third voltages.

10. A combination in accordance with claim 9 in which there is provided means for varying said first voltage to thereby vary said load voltage.

11. A combination in accordance with claim 7 in which there is provided means for varying said first voltage to thereby vary said load voltage.

12. In combination, a saturable reactor comprising a three-legged core, a first and a second winding on the outer legs respectively, and a third winding on the middle leg of said core, a transformer having a winding to which an alternating voltage is supplied from an alternating-current supply source, means for connecting the end terminals of said transformer winding to a first terminal of said first winding and to a first terminal of said second winding respectively, a first and a second rectifying element, means for connecting the second terminal of said first winding through said first rectifying element to the positive terminal of a load, means for connecting the second terminal of said second winding through said second rectifying element to said positive load terminal, means for connecting a mid-terminal of said transformer winding to the negative terminal of said load, auxiliary rectifying means connected to said transformer winding for setting up a unidirectional voltage across its positive and negative output terminals, the mid-terminal of said transformer winding being the positive output terminal of said auxiliary rectifying means, a cold cathode gas filled constant voltage device having an anode and a cathode, means for connecting said anode to the positive load terminal, a resistor, means comprising said resistor for connecting said cathode to said negative output terminal of said auxiliary rectifier, the voltage across said constant voltage device being equal to or less than the voltage across said load, a voltage dividing resistance path comprising a resistor and a potentiometer in series connected across said load, said resistor having a terminal connected to the positive load terminal and said potentiometer having a terminal connected to the negative load terminal, the resistance of said resistor being at least several times the resistance of said potentiometer, means for connecting the variable tap of said potentiometer to one terminal of said third winding, and means for connecting the cathode of said constant voltage device to the other terminal of said third winding.

13. In combination, a saturable reactor comprising a three-legged core, a first and a second winding on the outer legs respectively and a third winding on the middle leg of said core, a first and a second transformer each having a winding to which an alternating voltage is supplied from an alternating-current supply source, means for connecting the end terminals of said first transformer winding to a first terminal of said first winding and to a first terminal of said second winding respectively, a first and a second rectifying element, means for connecting the second terminal of said first winding through said first rectifying element to the positive terminal of a load, means for connecting the second terminal of said second winding through said second rectifying element to said positive load terminal, means for connecting a mid-terminal of said first transformer winding to the negative terminal of said load, an auxiliary bridge rectifier having input terminals and positive and negative output terminals, means for connecting said input terminals of said bridge rectifier to the end terminals respectively of said second transformer winding, a cold cathode gas-filled constant voltage device having an anode and a cathode, means for connecting said anode to the positive output terminal of said bridge rectifier, means for connecting said cathode to the negative load terminal, a current path having inductive reactance and resistance, means for connecting one terminal of said current path to the negative output terminal of said bridge rectifier, means for connecting the other terminal of said current path to said cathode, the voltage across said constant voltage device being larger than the load voltage, means for connecting one terminal of said third winding to the positive load terminal and means for connecting the other terminal of said third winding to a mid-terminal of said second transformer winding, the magnetomotive forces due to said first and second windings having the same direction across said middle leg.

14. A combination in accordance with claim 13 in which a ballast resistor is provided in the supply circuit from said supply source to said second transformer.

15. A combination in accordance with claim 14 in which a bleeder resistor is provided in a path connected across said load.

16. In combination, a saturable reactor comprising a three-legged core, a first and a second winding on the outer legs respectively and a third winding on the middle leg of said core, a first and a second transformer each having a winding to which an alternating voltage is supplied from an alternating-current supply source, means for connecting the end terminals of said first transformer winding to a first terminal of said first winding and to a first terminal of said second winding respectively, a first and a second rectifying element, means for connecting the second terminal of said first winding through said first rectifying element to the positive terminal of a load, means for connecting the second terminal of said second winding through said second rectifying element to said positive load terminal, means for connecting a mid-terminal of said first transformer winding to the negative terminal of said load, an auxiliary bridge rectifier having input terminals and positive and negative output terminals, means for connecting said input terminals of said bridge rectifier to the end terminals respectively of said second transformer winding, a cold cathode gas-filled constant voltage device having an anode and a cathode, means for connecting said anode to the positive output terminal of said bridge rectifier, means for connecting said cathode to the negative load terminal, a current path having inductive reactance and resistance, means for connecting one terminal of said current path to the negative output terminal of said bridge rectifier, means for connecting the other terminal of said current path to said cathode, the voltage across said constant voltage device being larger than the load voltage, means for connecting one terminal of said third winding to the positive load terminal, a second auxiliary rectifier having input terminals connected to said second transformer winding, a voltage-divider connected to the output terminals of said second auxiliary rectifier and means for connecting the other terminal of said third winding to a point of said voltage divider.

17. In combination, a saturable reactor comprising a three-legged core, a first and a second winding on the outer legs respectively, and a third winding on the middle leg of said core, a first transformer having a primary winding connected to an alternating-current supply source and a first secondary winding, a second transformer having a primary winding and a second and a third secondary winding, a resistive path for connecting the primary of said second transformer to said alternating-current supply source, means for connecting the end terminals of said first secondary transformer winding to a first terminal of said first winding and to a first terminal of said second winding respectively, a first and a second rectifying element, means for connecting the second terminal of said first winding through said first rectifying element to the positive terminal of a load, means for connecting the second terminal of said second winding through said second rectifying element to said positive load terminal, means for connecting a mid-terminal of said first transformer winding to the negative terminal of said load, a first and a second auxiliary bridge rectifier each having input terminals and positive and negative output terminals, means for connecting the input terminals of said first bridge rectifier to the end terminals respectively of said second secondary transformer winding, means for connecting the input terminals of said second bridge rectifier to the end terminals respectively of said third secondary transformer winding, a cold cathode gas filled constant voltage device having an anode and a cathode, means for connecting said anode to the positive output terminal of said first bridge rectifier, means for connecting said cathode to the negative load terminal, a current path having inductive reactance and resistance, means for connecting one terminal of said current path to the negative output terminal of said second bridge rectifier, means for connecting the other terminal of said current path to said cathode, means for conductively connecting the negative output terminal of said first bridge rectifier to the positive output terminal of said second bridge rectifier to form a common output terminal, a voltage-dividing resistive path connecting said common output terminal to a mid-terminal of one of said second and third secondary transformer windings, means for connecting one terminal of said third winding to the positive load terminal and means for connecting the other terminal of said third winding to a point of said voltage-dividing resistive path, the voltage across said constant voltage device being larger than the load voltage, the magnetomotive forces due to said first and second windings having the same direction across said middle leg.

18. In combination, a first rectifying means for supplying rectified current from an alternating-current supply source to a load, a cold cathode gas-filled constant voltage device, a second rectifying means, a circuit comprising said second rectifying means and excluding said first rectifying means for supplying rectified current from said supply source to said device to set up across said device a first unidirectional voltage which is substantially constant and larger than the voltage across said load, means for deriving from said supply source a second unidirectional voltage which is less than said first unidirectional voltage, means responsive to a voltage impressed thereon for regulating said load voltage and means for impressing upon said regulating means a resultant voltage having as components said first and second unidirectional voltages and said load voltage, said first voltage being in opposition to said second voltage and to said load voltage.

19. In combination, means for supplying rectified current from an alternating-current supply source to a load, a cold cathode gas-filled constant voltage device, means for deriving a first unidirectional voltage from said supply source, means for impressing said first unidirectional voltage upon a circuit comprising said constant voltage device to set up across said device a second unidirectional voltage which is substantially constant and larger than the voltage across said load, means responsive to voltage impressed thereon for regulating said load voltage, and means for impressing upon said regulating means a resultant voltage having as components a portion only of said first unidirectional voltage, said second unidirectional voltage and said load voltage, said second voltage being in opposition to said load voltage and to said portion of said first voltage.

20. In combination, means for supplying rectified current from an alternating-current supply source to a load, a cold cathode gas-filled constant voltage device, means for deriving a first unidirectional voltage from said supply source, means for impressing said first unidirectional voltage upon a circuit comprising said constant voltage device to set up across said device a second unidirectional voltage which is substantially constant and larger than the voltage across said load, means for deriving from said supply source a third unidirectional voltage, means responsive to a voltage impressed thereon for regulating said load voltage, and means for impressing upon said regulating means in series a portion of said first unidirectional voltage, said second unidirectional voltage, said third unidirectional voltage and said load voltage, said second unidirectional voltage being in opposition to said first unidirectional voltage and said load voltage.

References Cited in the file of this patent
UNITED STATES PATENTS

| Number | Name | Date |
|---|---|---|
| 2,040,492 | Logan | May 12, 1936 |
| 2,299,942 | Trevor | Oct. 27, 1942 |
| 2,434,069 | Goldberg | Jan. 6, 1948 |
| 2,556,129 | Wellons | June 5, 1951 |
| 2,565,621 | Olson | Aug. 28, 1951 |
| 2,573,744 | Trucksess | Nov. 6, 1951 |